United States Patent Office 3,654,071
Patented Apr. 4, 1972

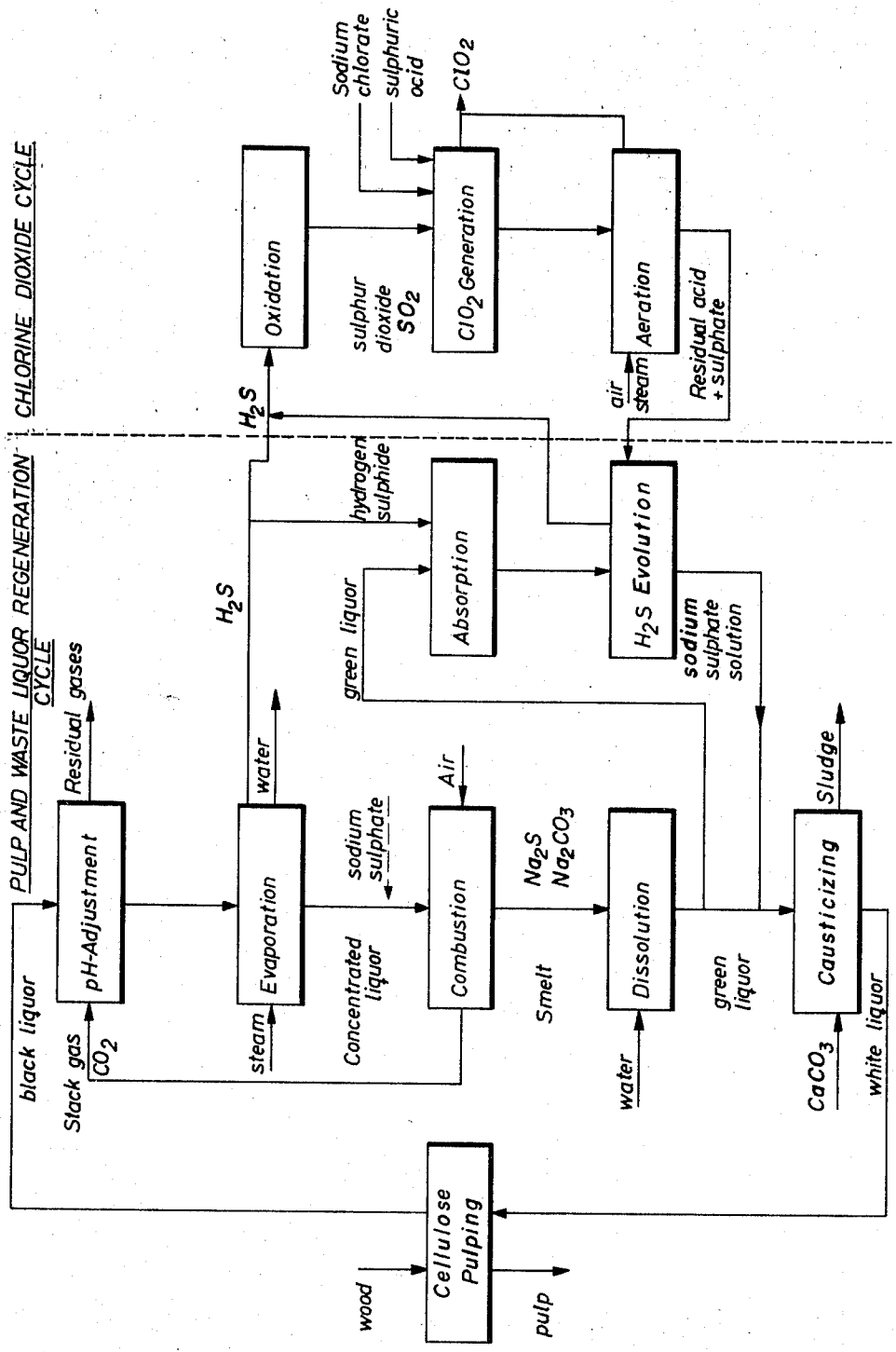

3,654,071
PROCESS FOR REPLACING SODIUM AND SULFUR LOSSES AND FOR CONTROLLING THE SULFIDE CONTENT IN SODIUM- AND SULFUR-CONTAINING CELLULOSIC DIGESTING LIQUORS
Rolf Karl August Brannland, Alfredshem, and Per-Erik Ingemar Alsefelt and Hans Otto Gyllensten, Husum, Sweden, assignors to Mo och Domsjo Aktiebolag, Ornskoldsvik, Sweden
Filed May 9, 1969, Ser. No. 823,519
Claims priority, application Sweden, May 10, 1968, 6,377/68
Int. Cl. D21c *11/12*
U.S. Cl. 162—33                         16 Claims

ABSTRACT OF THE DISCLOSURE

A sodium- and sulfur-containing acidic waste liquor from an auxiliary cellulose pulp-treating, processing or utilization process is combined with the inorganic chemicals recovered from kraft black liquor in an amount to replenish the sodium and sulfur losses and regenerate a white liquor for reuse as a kraft pulping liquor. Any excess sulfur is removed to restore sulfidity to a proper balance by separating hydrogen sulfide, the acidity of the resulting solution being so adjusted as to liberate the sulfur as hydrogen sulfide in appropriate amount.

---

The preparation of chemical and semi-chemical cellulose pulps by the digestion of wood requires considerable quantities of cooking chemicals. Rydholm, Pulping Processes, Interscience Publishers, New York (1965) chapter 11, page 764, indicates that from 200 to 500 kg. of cooking materials per ton of pulp is used. Accordingly, the way in which the spent chemicals are recovered, and any loss of chemicals replaced, is of importance to the economic feasibility of the pulping process. A process is acceptable for commercial use only if it permits recovery of chemicals from the spent or "black liquor," and use of these recovered chemicals to regenerate fresh cooking "white liquor."

A variety of chemicals recovery processes have been developed for both the sulfate and sulfite pulping processes. At pages 766 and 767, Rydholm summarizes the steps in ten chemical processes for use in various pulp cooking processes. On page 762, Rydholm sets forth a general recovery cycle utilized in kraft mills. The recovery cycle for the black or waste liquor from the kraft or sulfate pulp cooking operation comprises concentrating the spent cooking liquor, generally by evaporation, combusting or burning the concentrated liquor, to remove organic residues, redissolving the resulting inorganic chemical smelt to form the green liquor, and causticizing carbonate in the green liquor to hydroxide and replenishing the lost chemicals to the green liquor to form the white cooking liquor A typical kraft black liquor, according to Rydholm, page 774, has the composition:

Black liquor (total solids 17–22 percent)

| | Percent of total solids |
|---|---|
| Alkali lignins | 41 |
| Extractives | 3 |
| Hydroxy acids and lactones | 28 |
| Acetic acid | 5 |
| Formic acid | 3 |
| Methanol | 1 |
| Sulfur | 3 |
| Sodium | 16 |
| Total | 100 |

In chemicals recovery procedures based on the kraft process, the principal inorganic chemicals recovered are sodium carbonate and sodium sulfide. Since the white cooking liquor consists mainly of sodium hydroxide and sodium sulfide, causticizing is necessary to convert the carbonate to hydroxide, and sodium and sulfide lost during the processing must be replaced. Consequently, the black liquor is evaporated, and sodium sulfate is added prior to combustion (where organic materials, lignins, etc., are destroyed) as make-up to replace losses of sodium and sulfur. There are losses of sulfur during the evaporation, as hydrogen sulfide, and there are also losses of sulfur during the combustion, as sodium sulfate and $SO_2$, and the solid residue, or smelt, from the combustion, as indicated, is composed of sodium carbonate and sodium sulfide.

As a result of air pollution control requirements, it has been necessary to minimize venting of hydrogen sulfide and sulfur dioxide to the atmosphere. This has led to introduction of scrubbers, flue gas condensers, and other means for preventing their emission to the atmosphere. In the kraft process, the problem arises because the sulfidity (defined as the mole ratio of total sulfur/total $Na_2O$), will exceed the optimum level for minimum venting of such gases if sulfur-containing chemicals, such as sodium sulfate, are used as the sole replacement materials. The sulfidity can be controlled by adding sulfur-free alkali, e.g., NaOH or $Na_2CO_3$, to make up for the loss of any sodium chemicals during the cooking operation. However, the use of the nonsulfur-containing chemicals such as sodium hydroxide is relatively expensive, and the addition of such chemicals substantially increases the cost of the pulping process.

In accordance with the present invention, a process is provided for recovering inorganic chemicals from black liquor obtained in a kraft or sulfate pulping process, and replenishing the lost sodium and sulfur at a considerably decreased cost, while minimizing losses of pollutant gases to the atmosphere, and controlling sulfidity of the regenerated white liquor.

According to the prevent invention, a sodium- and sulfur-containing acidic waste liquor from an auxiliary cellulose pulp-treating, processing or utilization process is combined with the inorganic chemicals recovered from kraft black liquor in an amount to replenish the sodium and sulfur losses and regenerate a white liquor for reuse as a kraft pulping liquor. Any excess sulfur is removed to restore sulfidity to a proper balance by separating hydrogen sulfide, the acidity of the resulting solution being so adjusted as to liberate the sulfur as hydrogen sulfide in appropriate amount. The acidic waste liquor can be added to the recovered inorganic chemicals at any stage in the recovery process, i.e., to the black liquor, or to the white liquor, but addition to the green liquor is preferred. Addition to the white liquor is less preferable, because it involves a double chemical treatment. Since the white liquor is obtained by causticizing green liquor, increasing the pH, and the waste liquor is acidic, to convert the sodium carbonate to sodium hydroxide first wastes the caustic used in preparing the white liquor. Moreover, the organic compounds which are dissolved in the strongly alkaline black liquor tend to precipitate or solidly or gel if the pH of the solution is brought below 9, which complicates addition of the acid waste liquor to black liquor.

The process of the invention makes it possible to control sulfidity to within any desired tolerance, without venting noxious gases to the atmosphere. The acidic waste liquor can be added to the green liquor, and removal of sulfur as hydrogen sulfide can be effected freely, or under carefully controlled conditions which need not include a venting to the atmosphere. The waste liquor is cheaper than sodium sulfate, to supply a equivalent amount of sodium and sulfur.

It is desirable to utilize as efficiently as possible the acid present in the waste liquor for removal of hydrogen sulfide. The pH following addition of the waste liquor should be about 5 to about 7. The temperature is from 50° to 80° C. Under these conditions, hydrogen sulfide is from 50° to 80° C. Under these conditions, hydrogen sulfide is liberated freely in a single stage or in several stages. For example, a fractionating column hhaving from five to ten plates can be used. The acidic waste liquor and the green or white liquor are introduced at the top of the column, and heat is applied to the bottom of the column. The hydrogen sulfide gas is taken off at the top of the column, and the treated green or white liquor at the bottom. The pressure is not critical; however, it has been found in practice that a pressure of from 200 to 1000 mm. water gauge is suitable. This obviates the need for compressors or blowers for removing the hydrogen sulfide from the top of the column.

When treating spent cooking liquor containing organic material, i.e., black liquor, the acidic waste liquor should be added in such an amount that the pH does not fall substantially below 9. The explusion of hydrogen sulfide is carried out simultaneously with the evaporation of the black liquor, at relatively high temperatures, 80 to 120° C., preferably with a reduced pressure of from about 50 to 500 mm., in at least one stage of a multi-stage evaporation apparatus. The hydrogen sulfide can be removed overhead at a pressure below that of the evaporation system, e.g. by means of a water-sealed vacuum pump, a piston pump or a turbocompressor.

The hydrogen sulfide from the evaporating black liquor can also be absorbed by a suitable absorbent, such as a solution of monoethanolamine, diethanolamine, triethanolamine, potassium carbonate, sodium carbonate or an ammoniacal ammonium sulfate solution, under a vacuum, preferably of from about 50 to 500 mm. Hg absolute, and at lower temperatures, preferably from about 20 to 50° C. The absorbent containing the absorbed hydrogen sulfide is removed from the evaporation system and transferred to a suitable desorption apparatus operating at a slight pressure, suitably from about 200 to about 1000 mm. water gauge, and slightly higher temperatures, from about 60 to about 120° C., and preferably from about 70 to about 90° C. The hydrogen sulfide is desorbed and the relatively pure gas can then be transferred to subsequent stages, for instance, for conversion into sulfur, in a Claus furnace, as is explained later.

The hydrogen sulfide liberated during evaporation of black liquor can also be absorbed in the green liquor or the white liquor, which is then reacted with the acidic liquor. This permits removal of the hydrogen sulfide under vacuum, without the necessity of using special apparatus or media for absorbing and desorbing a transfer fluid.

The acidic waste liquor employed to regenerate the inorganic chemicals in black liquor, green liquor or in white liquor, in accordance with the invention, contains sodium and sulfur, and is preferably derived from a cellulose pulping or cellulose pulp-utilizing process, so as to avoid introducing foreign ions or substances into the system. Several types of such liquors are available at low cost.

The preferred waste liquor contains sodium and sulfur as sulfate $SO_4^=$ or bisulfate $HSO_4^-$, and is obtained from the chlorine dioxide preparation system, which is used in conjunction with pulp bleaching. Chlorine dioxide is generated by reduction of a chlorate salt, e.g. sodium chlorate, with sulfur dioxide in a concentrated sulfuric acid solution; this process results in the formation of the chlorine dioxide which is liberated as a gas, leaving as waste liquor an acidic aqueous solution of sodium sulfate, some hydrogen chloride formed by the reduction of the chlorate, and residual chlorine, sodium chlorate and sulfuric acid. The chlorine dioxide waste liquor should be chlorine- or chloride-free, so as to avoid the addition of chloride to the pulp digestion system, thereby increasing corrosion problems.

In accordance with the present invention, therefore, the acidic waste liquor from chlorine dioxide generation is aerated at elevated temperatures to remove the major portion of the chlorine. The liquor is ventilated with air, or other non-reducing gas, preferably at from about 10 to about 30 cubic meters of air per cubic meter of liquor at a temperature of from about 30 to 80° C. and preferably from 40 to 60° C. At these temperatures the remaining chlorate and chloride ions react to form chlorine dioxide and chlorine, which are then expelled in gaseous form with the air from the solution, to obtain a relatively pure acidic sodium sulfate or sodium bisulfate solution, which can then be suitably employed to regenerate the white liquor with recovered inorganic chemicals, without substantially increasing the chloride ion concentration in the pulp liquor. If the chlorate were not removed, as set forth above, the chlorate would be reduced to chloride in the cooking liquor, which is generally of a reducing nature, thereby increasing the proportion of chloride and thus increasing corrosion problems in the pulp digestion system.

Another useful waste liquor is the waste coagulation bath used in regeneration of cellulose xanthate solutions. Sodium cellulose xanthate is extruded into one or two coagulaton baths, in series, containing sulfuric acid, and salts such as sodium sulfate and bisulfate, magnesium sulfate, ammonium sulfate and zinc sulfate. A normal bath contains, for example, 130 g./l. $H_2SO_4$, 280 g./l. $Na_2SO_4$, 15 g./l. $ZnSO_4$. The heavy metal salts form a skin of metal cellulose xanthate on the filament, and are exhausted from the bath, leaving the sulfuric acid (if any is left, after reaction with sodium cellulose xanthate) and sodium sulfate (both as present originally, and as formed from the sulfuric acid reaction just mentioned).

The hydrogen sulfide which is recovered in the course of the process, from the black liquor evaporation, and from treatment with the acidic waste liquor, can be utilized in various ways. The hydrogen sulfide can be oxidized to sulfur dioxide, e.g. by combustion with air, and the sulfur dioxide thereby obtained utilized as the reducing agent in the generation of chlorine dioxide or in converting green liquor to sulfite liquor for use as pulping liquor in a neutral sulfite pulping process. This provides a cross recovery system in which the sulfur circulates between the chlorine dioxide generating process or other processes and the pulp digestion process.

A portion of the hydrogen sulfide expelled from the recovery process of this invention can be partially oxidized to form elemental sulfur, which can then be oxidized to sulfur dioxide, for use as above, or utilized as such for the preparation of sodium polysulfide, when it is desired to utilize the polysulfide variation of the kraft process, by dissolving the elemental sulfur in the white liquor to form sodium polysulfide. The use of polysulfides has been found to increase pulp yield over the conventional sulfate or kraft method. A further discussion of the polysulfide kraft method is set forth in Rydholm on pages 642 et seq.

The drawing is a flowsheet illustrating the present invention, as described above.

EXAMPLES

The system is a continuous process for operating a sulfate or kraft cellulose digestion mill in conjunction with a chlorine dioxide pulp bleaching process, and the amounts set forth are based on an hourly through-put. The mill is capable of producing 20 tons of pulp per hour, and bleaching it with 230 kg./hr. of chlorine dioxide.

(1) Chlorine dioxide cycle

The chlorine dioxide was produced by reacting 430 kg./hr. sodium chlorate with 150 kg./hr. sulfur dioxide (obtained from hydrogen sulfide from the waste liquor recovery cycle) in an aqueous solution containing 350 kg. sulfuric acid in 750 liters of water. The chlorine dioxide generation process yielded 1000 liters per hour of an acidic waste liquor containing 570 g./l. sodium sulfate and 400 g./l. sulfuric acid, 5 g./l. sodium chlorate, 3 g./l. sodium chloride and 2 g./l. chlorine dioxide.

The liquor was aerated at a rate of 20 m.$^3$/hr. The air was bubbled countercurrently through the solution at a temperature of 55° C. The concentration of chlorine-containing compounds in the liquor was thus reduced to 1 g./l. sodium chlorate, 0.5 g./l. sodium chloride, and 0.1 g./l. chlorine dioxide. The aerated solution was then passed to the waste liquor recovery cycle to replenish sodium and sulfur.

(2) Waste liquor regeneration cycle

The pulp digestion system yielded from the pulp digestion, 270 m.$^3$/hr. black liquor containing 33 g./l. alkali, calculated as NaOH, 5 g./l. sulfur and 80 g./l. organic material. The black liquor was carbonated with 1000 m.$^3$/hr. stack fumes containing 15% $CO_2$, and the pH thus was reduced to 10.5. The carbonated liquor was evaporated to a solids content of 60%, in the course of which 100 kg./hr. hydrogen sulfide was expelled, and absorbed in 3000 l./hr. of green liquor (obtained by dissolving the melt from combustion of the evaporated black liquor). The concentrated black liquor was then passed to the combustion chamber, where the remaining water was removed, and the organic components were burned, leaving a residue, or smelt, comprising sodium sulfide and sodium carbonate. The stack fumes were utilized to neutralize the next quantity of black liquor. The smelt was dissolved in water to form a solution containing the equivalent of 100 g. NaOH per liter to form a green liquor, which was then cycled to absorb hydrogen sulfide expelled during the evaporation of another portion of black liquor.

The green liquor containing the absorbed hydrogen sulfide (3000 l./hr.) was then mixed with the acidic waste liquor from the chlorine dioxide generation process (1000 l./hr.) to form a mixture having a pH of 5.5. The mixed solutions were passed downwardly at a flow rate of 120 kg./hr. from the top through a fractionating column having five trays; steam was added to the bottom tray of the column. The temperature of the column was maintained at 75° C. The hydrogen sulfide was expelled almost completely from the liquid mixture, and removed from the top of the column.

The liberated hydrogen sulfide was reacted with 400 m.$^3$/hr. of air to form sulfur dioxide. A portion of the $SO_2$, 150 kg./hr. was returned to the chlorine dioxide generation system. A second portion of $SO_2$, 40 kg./hr. was utilized for neutralizing the pulp after the chlorine dioxide bleaching stage. About 10 kg./hr. $SO_2$ were lost.

The green liquor from the bottom of the column, which had a pH of 5.5 was then returned to the green liquor system for causticizing to form the white cooking liquor for further pulp digestion. The reconstituted liquor represented a supply of 570 kg./hr. of sodium sulfate, 28.5 kg. per ton of pulp, corresponding to about 70% of the chemical losses in the digestion and recovery system. This represents a very satisfactory recovery, and minimizes the sodium sulfate from external sources.

Having regard to the foregoing disclosure, the following is claimed as the inventive and patentable embodiments thereof:

1. A process for recovering inorganic chemicals from black liquor obtained in a kraft or sulfate pulping process without reference to a sulfite pulping process, and replenishing the lost sodium and sulfur at a considerably decreased cost, while minimizing losses of pollutant gases to the atmosphere, and controlling sulfidity of the regenerated white liquor, which comprises the combination in any order of the steps of (1) recovering the inorganic chemicals from kraft black liquor and (2) blending therewith an acidic waste liquor containing sodium and sulfur as a member selected from the group consisting of sulfate $SO_4^=$ and bisulfate $HSO_4^-$ and substantially free of chlorine and chloride from an auxiliary cellulose pulp-treating, processing or utilization process, in an amount to replenish the sodium and sulfur losses and regenerate a white liquor for reuse as a kraft pulping liquor; and then (3) adjusting the acidity of the combined liquors to a pH at which hydrogen sulfide is evolved, and removing excess sulfur as hydrogen sulfide to restore sulfidity to a proper balance.

2. A process according to claim 1 which comprises removing any excess sulfur to restore sulfidity to a proper balance by separating hydrogen sulfide at from 50 to 120° C.

3. A process according to claim 1 in which the acidity of the liquor is adjusted to a pH within the range from about 5 to about 7 to liberate the sulfur as hydrogen sulfide in appropriate amount.

4. A process according to claim 1 in which the acidic waste liquor is added to black liquor.

5. A process according to claim 1 in which the acidic waste liquor is added to white liquor.

6. A process according to claim 1 in which the acidic waste liquor is added to green liquor.

7. A process according to claim 1 in which the acidic waste liquor is added to the smelt of inorganic chemicals obtained after combustion of black liquor.

8. A process according to claim 1 in which the pH of the liquor following addition of the waste liquor is from about 5 to about 7, and the liquor is heated at from 50° to 80° C. to liberate hydrogen sulfide.

9. A process according to claim 8 in which a column having from five to ten plates is used, acidic waste liquor and green or white liquor are introduced at the top of the column, and heat is applied to the bottom of the column, the hydrogen sulfide gas is taken off at the top of the column, and the treated green or white liquor at the bottom.

10. A process according to claim 1 in which the acidic waste liquor is added to black liquor in such an amount that the pH does not fall substantially below 9, and the expulsion of hydrogen sulfide is carried out simultaneously with evaporation of the black liquor at from 80 to 120° C., at a reduced pressure of from about 50 to about 500 mm.

11. A process according to claim 10 in which the hydrogen sulfide from the evaporating black liquor is recovered and a first part converted to a member selected from the group consisting of sulfur and sulfur dioxide and a second part absorbed in the liquor which is blended with the acidic waste liquor.

12. A process according to claim 1, in which the acidic waste liquor contains sodium and sulfur as sulfate $SO_4^=$ or bisulfate $HSO_4^-$, and is obtained from a chlorine dioxide preparation system used in conjunction with pulp bleaching.

13. A process according to claim 12, in which the acidic waste liquor from chlorine dioxide generation is aerated at elevated temperatures to remove the major portion of the chlorine and obtain a relatively pure acidic sodium sulfate or sodium bisulfate solution.

14. A process according to claim 1 in which the acidic waste liquor is the waste coagulation bath used in regeneration of cellulose xanthate solution.

15. A cyclic waste liquor cross recovery process, in which recovery of inorganic chemicals and hydrogen sulfide from black liquor obtained in a kraft or sulfate pulping process is combined with recovery of inorganic chemicals from acidic waste liquor in an allied cellulose pulping process, comprising carbonating black liquor to a pH at which hydrogen sulfide is liberated, concentrating the black liquor and expelling hydrogen sulfide, evaporating the concentrated black liquor to dryness and subjecting the solids to combustion, forming an inorganic smelt, dissolving the smelt in water to form green liquor, absorbing a first part of the hydrogen sulfide expelled during evaporation in the green liquor, converting a second part of the hydrogen sulfide to sulfur dioxide, reacting the sulfur dioxide with chlorate and sulfuric acid to generate chlorine dioxide, aerating acidic waste chlorine dioxide generating liquor to remove residual chlorine, blending the acidic waste liquor with the green liquor containing the hydrogen sulfide, and causticizing the blended liquor to form white liquor, for recycling to the kraft or sulfate pulping process.

16. A process according to claim 15 in which the hydrogen sulfide is a third part converted to sulfur, and this is reacted with the white liquor to form a polysulfide pulping liquor.

References Cited
UNITED STATES PATENTS

| | | | |
|---|---|---|---|
| 2,394,470 | 2/1946 | O'Shaugnessy | 23—181 X |
| 2,841,561 | 7/1958 | Gray et al. | 162—33 X |
| 2,974,081 | 3/1961 | Biggs Jr., et al. | 162—33 |
| 3,210,236 | 10/1965 | Coppick et al. | 162—33 |
| 3,366,534 | 1/1968 | Rapson | 162—30 |
| 3,554,858 | 1/1971 | Timpe | 162—30 |

S. LEON BASHORE, Primary Examiner

A. D'ANDREA, JR., Assistant Examiner

U.S. Cl. X.R.

23—48; 162—45

UNITED STATES PATENT OFFICE
CERTIFICATE OF CORRECTION

Patent No. 3,654,071            Dated April 4, 1972

Inventor(s) R.K.A. Brannland et al.

It is certified that error appears in the above-identified patent and that said Letters Patent are hereby corrected as shown below:

| | | |
|---|---|---|
| Column 2, line 62 | : | "solidly" should be --solidify-- |
| Column 2, line 64 | : | "acid" should be --acidic-- |
| Column 3, line 1 | : | "a" should be --an-- |
| Column 3, lines 7, 8 &9 | : | delete "from 50° to 80°C. Under these conditions, hydrogen sulfide is" |
| Column 3, line 10 | : | "hhaving" should be --having-- |
| Column 3, line 24 | : | "explusion" should be --expulsion-- |

Signed and Sealed this fifteenth Day of June 1976

[SEAL]

Attest:

RUTH C. MASON
Attesting Officer

C. MARSHALL DANN
Commissioner of Patents and Trademarks